(12) United States Patent
De Guglielmo et al.

(10) Patent No.: US 7,055,671 B2
(45) Date of Patent: Jun. 6, 2006

(54) METHOD FOR FORMING AND SPACING OUT SUCCESSIVE BATCHES OF ARTICLES

(75) Inventors: Pascal De Guglielmo, Montgueux (FR); Jean Christophe Hautefaye, Sainte Savine (FR)

(73) Assignee: Aries Packaging, Rosieres (FR)

( * ) Notice: Subject to any disclaimer, the term of this patent is extended or adjusted under 35 U.S.C. 154(b) by 0 days.

(21) Appl. No.: 10/939,165

(22) Filed: Sep. 10, 2004

(65) Prior Publication Data
US 2005/0230221 A1 Oct. 20, 2005

(30) Foreign Application Priority Data
Sep. 12, 2003 (FR) .................................. 03 50536

(51) Int. Cl.
*B65G 47/26* (2006.01)
(52) U.S. Cl. ................. 198/419.2; 198/459.2
(58) Field of Classification Search ............. 198/419.2, 198/459.2, 461.2
See application file for complete search history.

(56) References Cited

U.S. PATENT DOCUMENTS

| | | | |
|---|---|---|---|
| 3,482,674 A | 12/1969 | Wiseman | 198/34 |
| 4,519,492 A * | 5/1985 | Focke | 198/408 |
| 5,082,104 A * | 1/1992 | Marceau | 198/419.3 |
| 5,263,568 A * | 11/1993 | Francioni | 198/419.2 |
| 5,699,651 A | 12/1997 | Miller et al. | 53/448 |
| 5,915,523 A * | 6/1999 | Spatafora | 198/461.3 |
| 6,443,689 B1 | 9/2002 | Reggiani | 414/795.6 |
| 6,527,102 B1* | 3/2003 | De Guglielmo et al. | 198/419.3 |

FOREIGN PATENT DOCUMENTS

| | | |
|---|---|---|
| EP | 0 860 385 B1 | 11/2000 |
| EP | 1 116 675 A1 | 7/2001 |
| EP | 1 153 859 A1 | 11/2001 |

* cited by examiner

*Primary Examiner*—James R. Bidwell
(74) *Attorney, Agent, or Firm*—Nawrocki, Rooney & Sivertson, P.A.

(57) ABSTRACT

A method and apparatus for forming and separating successive batches of articles such as bottles, cans, etc. The invention includes a first driving system for receiving, at a feed station, articles driven by a first rotating transfer system. The speed of the first rotating transfer system is gradually accelerated so that, as articles arrive at an outlet station, the speed at the outlet station is equal to the outlet speed. The first driving system is then disengaged. A second driving system interfaces with a variable space defined by a control device between the first and second driving systems.

10 Claims, 2 Drawing Sheets

METHOD FOR FORMING AND SPACING OUT SUCCESSIVE BATCHES OF ARTICLES

TECHNICAL FIELD

This invention relates to a method for forming and separating successive batches of articles as well as a device for implementing the method.

The invention is applied especially to the packaging of articles such as bottles, cans or tubs (for example, yoghurt tubs), generally with a cylindrical shape.

BACKGROUND OF THE INVENTION

In the packaging industry, distributors seek to offer an ever more diversified range of packaged products whilst increasing production rates. Therefore, it is important to be able to quickly adjust a packaging device so that it can package products in a large number of ways. Here, more specifically speaking, the interest is placed on the number of articles packed together, in fact the distributors often offer a large choice of packages for the same product: bottles presented in packs of two, three or six, for example.

A system is already known for transporting the articles one by one to a grouping device for forming and spacing out the batches of articles then transporting the batches to a unit thereby allowing their packaging.

To do so, the grouping device is so arranged as to group together a given number of articles forming a batch then to increase the transportation speed for the batch in order to space it out from the following batches.

In document EP-1 116 675, the grouping system is presented in the form of a cogged wheel in which each cog can be speeded up to space one batch away from the following one. However in such a device, the spacing between the cogs is substantially constant, which does not allow the number of articles per batch to be adjusted easily. To change this number, in fact it is necessary to dismount the cogged wheel to change the number and/or the distribution of the cogs on the wheel.

In document EP-0 860 385, the grouping device includes a rotating system including several sectors, each one moved in rotation by a rotating shaft linked to a motorised unit the speed of which is controlled. Thus a first sector drives along several articles, then this sector is speeded up by its rotating shaft in order to separate it from the following sector which is still performing the step of forming the following batch.

Such a device allows the space between each batch to be chosen by selecting a suitable speed profile. However, each sector is provided for forming a batch including a given and constant number of articles. Such a device is therefore difficult to adapt and does not allow the number of articles per batch to be modified without changing the parts that form the device.

Furthermore, the devices described above allow the articles to be pushed upstream, but not to retain them downstream, which may mean that some articles fall off the device.

Devices for grouping batches of articles together are also known from documents U.S. Pat. No. 3,482,674, EP-1 153 859, U.S. Pat. No. 5,699,651 and U.S. Pat. No. 6,443,689. Anyway, these devices do not allow batches to be formed for which the number of articles is adjustable whilst the device is working using rotating transfer systems.

SUMMARY OF THE INVENTION

The invention is aimed at making up for these drawbacks by proposing a method and a device for forming and spacing out successive batches of articles that allow the number of articles per batch and the gap between each batch to be adjusted in a simple and fast manner as well as preventing them from falling off the device.

For this purpose, the invention relates to a method for forming and spacing out successive batches of articles including the following phases:
  transporting some articles one by one along a feed belt to a feed station, at a substantially constant input speed;
  grouping and transferring a given number of articles in the form of a batch from the feed station to an outlet station by means of rotating transfer systems of the type including at least a first and a second coaxial rotating shafts suitable to be rotated independently from each other by motorised means with the speed controlled by a control device, the first and second shafts respectively being linked to a first and to a second rotating transfer system the transfer speed of which is not constant and is determined by the control device;
  transferring the articles in the form of successive batches along an outlet belt as from the outlet station, at an outlet speed faster than the input speed.

The phase for grouping and transferring the articles includes the following steps:
  engaging, at the feed station, a first article driving system carried by the first rotating transfer system upstream from an article forming part of a batch of articles downstream at a transfer speed equal to the input speed;
  gradually accelerating the first rotating transfer system and thus the batch of articles up to the output station so that the speed of the transfer at the outlet station will be equal to the outlet speed;
  disengaging, at the outlet station, the first system for moving articles;
  engaging, at the feed station, a second driving system carried by the second transfer system with a variable space that is determined by the control device between the first and the second driving systems, so that the adjustment of the control device will make it possible to vary the number of articles per batch and/or the gap between each batch.

According to one aspect, the phase for grouping and transferring articles includes a return step for the first driving system, after it has been disengaged at the outlet station, so that this driving system will form a retaining system for the batch of articles driven by the second driving system.

According to another aspect, the invention relates to a device for forming and spacing out successive batches of articles, for implementing the method described above, including:
  a feed belt along which the articles are transferred one by one to a feed station at a substantially constant speed;
  an outlet belt suitable for receiving successive batches of articles from an outlet station in order to transfer them at a substantially constant outlet speed that is faster than the input speed;
  means for transferring the articles from the feed station to the outlet station such that the articles transferred one by one to the feed station reach the outlet station in successive batches, with the said means for transfer being of the type including at least a first and a second coaxial rotating shafts, with each one being suitable for being rotated independently from each other by motorised means, the speed of which is controlled by a control device, with the said shafts rotatably driving and being linked to a first and to a second rotating transfer system, respectively.

Each transfer system carries at least one driving system for articles so arranged as to be engaged at the feed station upstream from an article forming part of a batch of articles downstream including a set number of articles and to be disengaged at the outlet station, with this transfer system having a transfer speed that is not constant and is determined by the control device by means of the rotating shafts, with the said transfer speed being such that it is substantially equal to the input speed when the driving system is engaged at the feed station, then it increases gradually until it is substantially equal to the outlet speed when the driving system is disengaged at the outlet station.

The structure of the device is such that a first driving system carried by the first transfer system is followed by a second driving system carried by the second transfer system with a variable space that is determined by the control device between the first and the second driving systems, so that the adjustment of the control device will make it possible to vary the number of articles per batch and/or the gap between each batch.

BREIF DESCRIPTION OF THE DRAWING

Other objects and advantages of the invention will be best understood by reference to the following description, together with the accompanying drawings, in which.

DETAILED DESCRIPTION OF THE INVENTION

Figure 1:
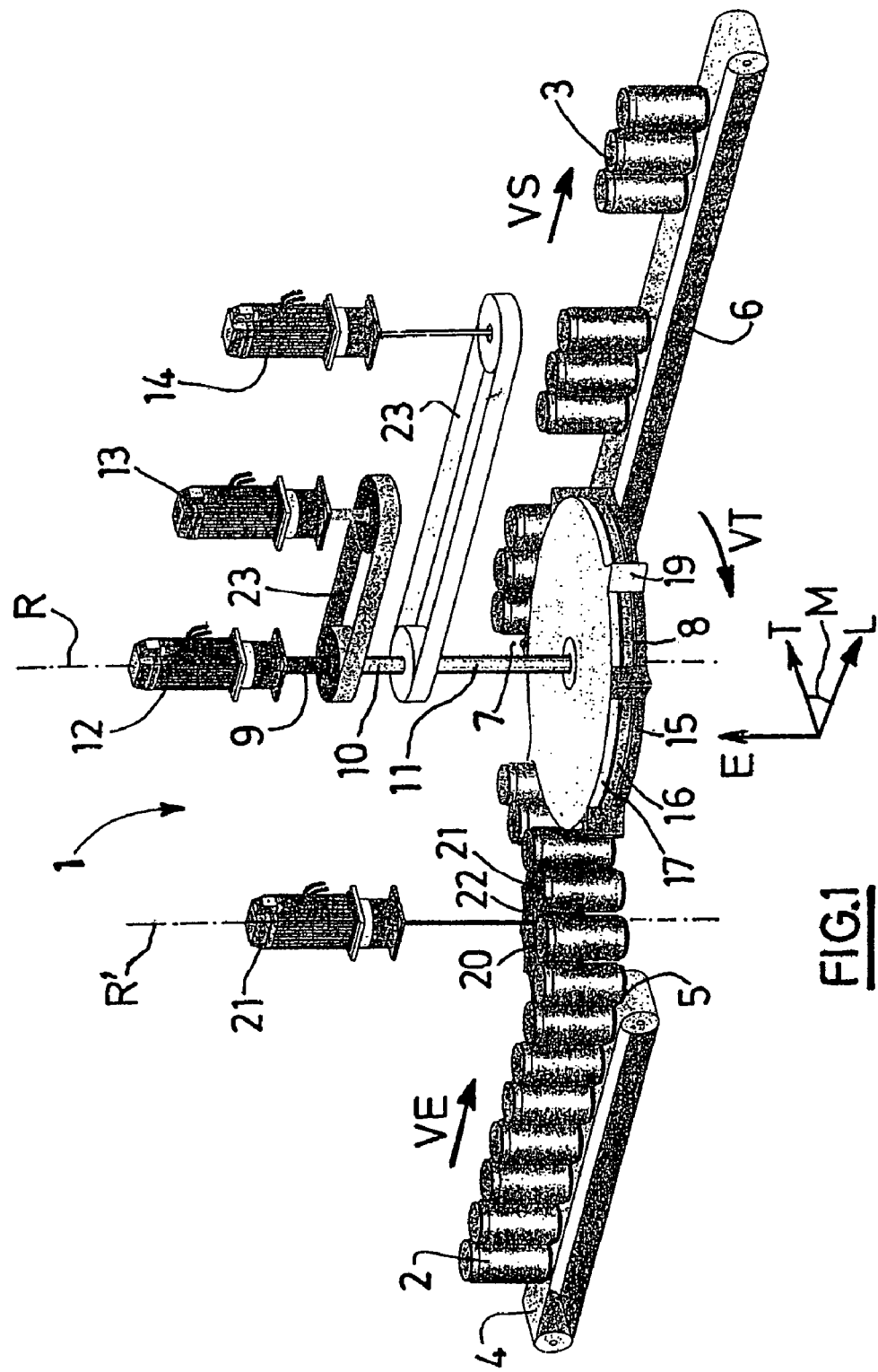
FIG. 1 is a perspective view of a device in accordance with the invention, with the said device forming and spacing out the successive batches of articles.

In reference to FIG. 1, an embodiment of the invention is now described for a device 1 for forming and spacing successive batches 3 of articles 2 such as bottles or cans, from which some finished products such as packs are formed.

To be packaged, the articles 2 undergo at least one operation for grouping in batches 3 spaced out from each other. This operation takes place in a substantially horizontal plane M.

The articles 2 are transferred towards the device 1 following a longitudinal direction L included in the plane M. The batches 3 formed leave the device following the same direction L. A transversal direction is also defined perpendicularly to the direction L in the plane M, as well as a direction E for elevation perpendicularly to the directions L and T such that all three directions form a direct trihedron.

The terms "upstream" and "downstream" are defined with regards to the direction L and the terms "above" and "height" with regards to the direction E.

The device 1 includes a feed belt 4 on which the articles 2 are transferred one after another, for example, substantially without any space between them, in the direction L. The articles are transferred to a feed station 5 downstream, for example, joined to one end of the conveyor belt 4.

The feed belt 4 transfers the articles 2 at a substantially constant input speed VE. This conveyor belt is, for example, a motorised, moving belt or any other equivalent means.

The device 1 also includes an outlet belt 6 along which the articles 2 grouped in successive batches 3 spaced apart are transferred towards the rest of the packaging system. The outlet belt 6 transports the articles 2 from upstream to downstream from an outlet station 7, for example, joined to the upstream end of the outlet belt 6. The batches 3 are transferred at a substantially constant outlet speed VS, higher than the input speed VE. The outlet belt 6 is, for example, of the same type as the feed belt 4.

Transfer means 8 are arranged between the feed belt 4 and the outlet belt 6. These means allow to group the articles 2 into batches 3 as from the feed station 5, spacing the batches away from one another and transferring them on the outlet belt 6 to the outlet station 7.

These transfer means are arranged so as to make it possible to vary the number of articles 2 per batch 3 and the space between two batches of articles without having to interrupt the packaging process.

For this purpose, the transfer means include at least two coaxial rotating shafts. In the embodiment of the invention shown in the figures, the transfer means include three coaxial, rotating shafts 9, 10 and 11. Each shaft is suitable for rotating independently from the others around an axis R substantially parallel to the direction E and is driven by motorised means, respectively, 12, 13 and 14.

The speed for these motorised means is controlled by a control device, not shown in the figures. The operator can, by using this device, impart speed profiles on the motorised means and so control the rotation for each shaft 9, 10 and 11 according to the desired speed profiles. The motorised means 12, 13 and 14 are motors for which the rotation speeds are adjustable continuously, electrical motors of the brushless direct current type, for example.

According to the embodiment of the invention shown in FIG. 1, the motorised means 12 is directly linked to the shaft 9, whilst the motorised means 13 and 14 can, respectively, drive the shafts 10 and 11 using pulleys 23. The shafts 9, 10 and 11 are respectively linked to transfer systems 15, 16 and 17.

The shafts drive these transfer systems 15, 16 and 17 rotating around the axis R. Each system can therefore turn independently from the others and its speed is controlled by the control device.

The transfer systems 15, 16 and 17 are presented, for example, in the form of substantially similar disks arranged above one another and each one carrying at least one articles driving system 19. In the embodiment of the invention shown in the Figures, each transfer system includes two driving systems 19 diametrically opposed on the periphery of the disk.

The driving systems 19 are further arranged such that, on the periphery of the transfer systems 15, 16 and 17, the driving system of a transfer system will be adjacent to a driving system of another transfer system.

The driving system for articles 2 is shown, for example, in the form of a cog stretching out radially from the periphery of the transfer systems. The driving systems 19 may further be so arranged as to stretch out beyond each transfer system following the direction E, such as to have a height equal to the total thickness of the superimposed transfer systems. Thus, the driving systems have a larger surface area for working with the articles, which allows the risks of articles falling off to be reduced.

The transfer means 8 rotate at a transfer speed VT that is not constant, ranging between VE and VS.

The transfer means 8 are so arranged that a driving system 19 may be engaged at the feed station 5 upstream from an article 2 belonging to a batch 3 stretching downstream from the driving system at a speed VT substantially equal to VE and disengaged, at a speed VS substantially equal to VT, at the outlet station 7 after having run a part of a circular path, during which the speed TS has changed from VE to VS.

For this purpose, the cog forming the driving system 19 includes an upstream side and a downstream side with each one having a complementary shape of part of an article 2 so as to be able to drive or retain an article 2 using, respectively, the downstream side and the upstream side.

The transfer means 8 may further include means 20 arranged close to the feed station 5, suitable for ordering and controlling the rate of the articles 2 arriving from the feed belt 4, so that they are positioned and spaced as desired upon the engaging of a driving system 19 upstream from an article 2.

These means are, for example, in the form of a star-shaped wheel driven in rotation around an axis R' substantially parallel to the axis R by motorised means 21. The motorised device 21 is, for example, similar to the motorised means 12, 13 and 14 and is also controlled as regards speed by the control device.

The star-shaped wheel 20 includes a cogged arrangement 21 around its periphery suitable for engaging and disengaging the articles 2. The cogged arrangement 21 has recesses 22 suitable for receiving the articles individually. The tangential speed of the star-shaped wheel 20 is substantially equal to the input speed VE.

The method for forming and spacing out successive batches of articles, thus implementing the device described above, will now be described in reference to FIGS. 2 and 3.

In the embodiment of the invention shown in these Figures, the transfer means include a first and a second transfer systems, respectively 15 and 16, superimposed one above the other and with each one carrying two driving systems 19 diametrically opposed on the periphery of the transfer systems 15 and 16. The transfer means drive the driving systems along a circular path.

In addition, the driving systems 19 are so arranged that a driving system 19a in the first transfer system 15 will be followed by a driving system 19b in the second transfer system 16.

During a first step, the articles 2 are transferred one by one to the feed station 5 by means of the feed belt 4 and the star-shaped wheel 20 at an input speed VE. A driving system 19a is engaged upstream from an article 2 belonging to a batch 3, spreading downstream from the driving system 19a. The driving system is then located in a first angular position of its circular path.

The control device adjusts the speed VT of the first transfer system 15 such that it will be substantially equal to VE upon engaging the driving system. Hence, the takeover of a batch of articles by a driving system is performed without any brusque change in speed that might cause a collision, if not a fall, of the articles.

The number of articles per batch is determined by the operator by adjusting the space between two successive driving systems 19. This adjustment may take place without interrupting the packaging line by slowing down, for example, a transfer system with respect to another one until the driving systems 19, following one another, in these transfer systems are spaced out sufficiently.

The following step consists in accelerating the first transfer system 15 so as to push the driving system 19a away from the system 19b following it. A space, also called gap, is thus created between each batch 3. This gap may also be adjusted by the operator by adapting the speed profiles for each motorised means. Thus, by increasing the acceleration of the first transfer system 15, the gap between each batch 3 is increased.

The driving system is then disengaged at the outlet station 7 in a second angular position of its circular path. This disengagement is performed at a speed VT substantially equal to the speed VS. Hence, the transfer to the outlet belt 6 is performed without a brusque change in speeds. The batch 3 is then taken over by the outlet belt 6.

Figure 2:
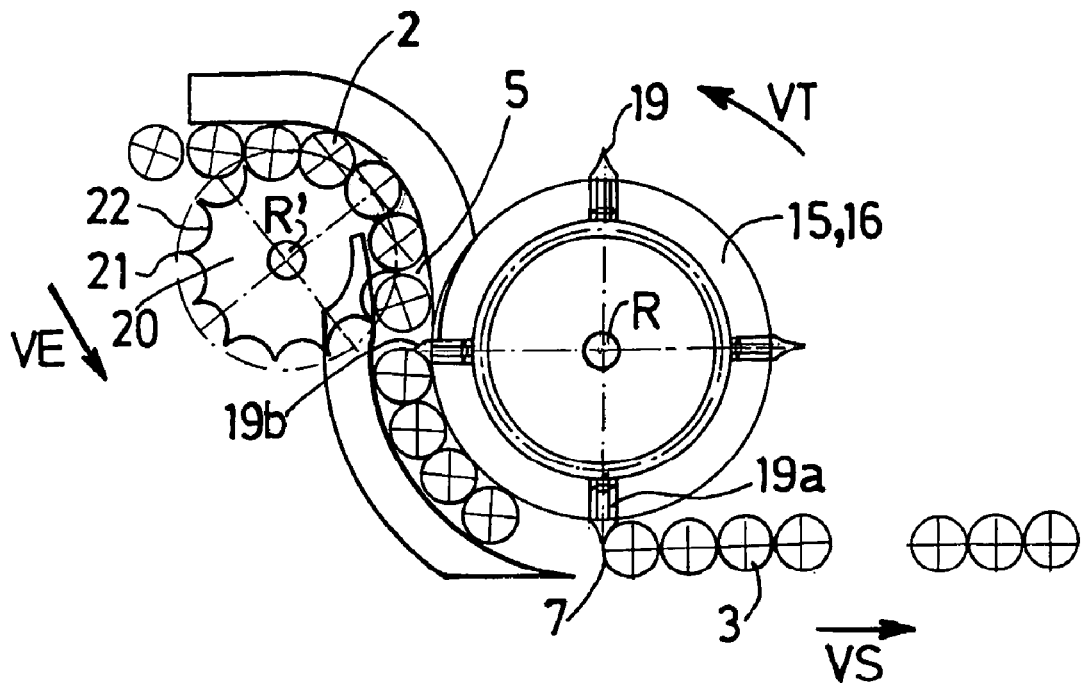
FIG. 2 is a top view of the arrangement of the device in accordance with the invention illustrating the method for forming and spacing articles into successive batches.
Figure 3:
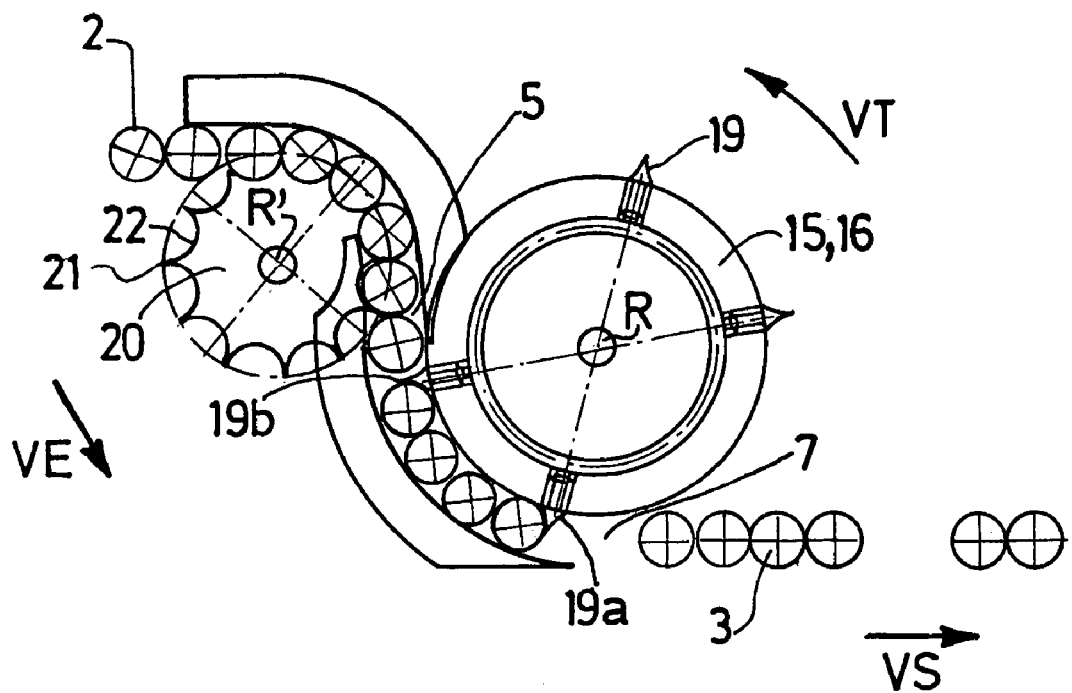
FIG. 3 is a top view of the arrangement of the device in accordance with the invention, wherein the method includes a return step of a drive device so that the latter will form a retaining system.

Upon disengaging the driving system 19a, the driving system 19b is engaged upstream from an article so as to form the following batch 3, as may be ascertained in FIG. 2.

To prevent falls of articles 2 off the device 1 whilst they are taken over by the transfer means 8, the method can also include a return step of the first transfer system 15 after the driving system 19a has been disengaged at the outlet station 7. Hence, by reversing the rotation direction of the first transfer system 15, the driving system 19a is engaged downstream from the batch 3 driven by the driving system 19b. The speed of the first transfer system 15 is then adapted to that of the second transfer system 16 such that the driving system 19b pushes forward a batch of articles 3 whilst the driving system 19a prevents the articles 2 from this batch from falling.

The invention claimed is:

1. A method for forming and spacing out successive batches (3) of articles (2) including the following phases:
    transferring articles (2) one by one along a feed belt (4) up to a feed station (5), at a substantially constant input speed (VE);
    grouping and transferring a given number of articles (2) in the form of a batch (3) from the feed station (5) to an outlet station (7) using rotating transfer means (8) of the type including at least a first and a second coaxial rotating shaft (9, 10) suitable for being rotated independently from one another with motorised means (12, 13) with their speed controlled by a control device, with the first and second shafts respectively being linked to a first and to a second rotating transfer system (15, 16) having a transfer speed (VT) that is not constant and is determined by the control device;
    transferring the articles (2) in the form of successive batches 3 along an outlet belt (6) from the outlet station (7), at an outlet speed (VS) higher than the input speed (VE),
with the said method being characterised in that the phase for grouping and transferring articles (2) includes the following steps:
    engaging, at the feed station, a first driving system (19a) for articles carried by the first rotating transfer system (15) upstream from an article (2) forming part of a batch (3) of articles downstream at a transfer speed (VT) equal to the input speed (VE);
    gradually accelerating the first rotating transfer system (15) and so the batch of articles up to the outlet station (7) such that the transfer speed (VT) at the outlet station will be equal to the outlet speed (VE);
    disengaging, at the outlet station (7), the first driving system (19a) for articles (2);

engaging at the feed station (5) a second driving system (19b) carried by the second transfer system (16) with a variable space and determined by the control device between the first and the second driving systems, so that the adjustment by the control device makes it possible to vary the number of articles (2) per batch (3) and/or the gap between each batch (3).

2. A method according to claim 1, characterised in that the phase for grouping and transferring articles (2) includes a step for return of the first driving system (19a) after it has been disengaged at the outlet station (7) so that this driving system (19a) forms a retaining system for the batch (3) of articles driven by the second driving system (19b).

3. A device (1) for forming and spacing out the successive batches (3) of articles (2) for implementing the method in accordance with claim 1, including:
  a feed belt (4) along which the articles (2) are transferred one by one up to a feed station (5) at a substantially constant input speed (VE);
  an outlet belt (6) suitable for receiving the successive batches (3) of articles from an outlet station (7) in order to transfer them at a substantially constant outlet speed (VS) and higher than the input speed (VE);
  means for transferring (8) the articles (2) from the feed station (5) up to an outlet station (7) such that the articles transferred one by one to the feed station (5) will be grouped into successive batches (3) at the outlet station (7), with the said transfer means being of the type including at least a first and a second coaxial rotating shaft (9, 10), with each one being suitable for being rotated independently from one another by motorised means (12, 13) with their speed controlled by a control device, with the said shafts rotatably driving and being linked to a first and a second rotating transfer system (15, 16), respectively;
with the said device (1) for forming and spacing out batches being characterised in that each transfer system (15, 16) carries at least one driving system (19) for articles so arranged as to be engaged at the feed station (5) upstream from an article (2) forming part of a batch (3) of articles downstream including a given number of articles (2) and to be disengaged at the outlet station (7), with this transfer system having a transfer speed (VT) that is not constant and is determined by the control device by means of the rotating shafts (9,10), with the said transfer speed (VT) being such that it is substantially equal to the input speed (VE) when the driving system (19) is engaged at the feed station (5), then it gradually increases until it is substantially equal to the outlet speed (VS), when the driving system (19) is disengaged at the outlet station (7), with the structure of the device (1) being such that a first driving system (19a) carried by the first transfer system (15) is followed by a second driving system (19b) carried by the second transfer system (16) with a variable space that is determined by the control device between the first and the second driving systems, so that the adjustment of the control device makes it possible to vary the number of articles (2) per batch (3) and/or the gap between each batch (3).

4. A device according to claim 3, characterised in that the first and the second transfer systems (19a, 19b) are respectively coaxial disks rotating around the axle (R) of the coaxial shafts, with the said disks being superimposed one over another and with each one including on their periphery at least one driving system (19).

5. A device according to claim 3, characterised in that the driving systems (19) for articles are cogs that protrude radially from the transfer systems, with each cog including an upstream side and a downstream side so arranged as to have a complementary form of a part of an article (2) so as to be able to drive, respectively, an article using the downstream side or hold back an article using the upstream side, with each cog travelling in a circle passing through a first angular position in which it is engaged at the feed station (5) and a second angular position in which it is disengaged at the outlet station (7).

6. A device according to claim 3, characterised in that the transfer means (8) also include means (20) arranged close to the feed station, suitable for ordering and controlling the rate of the articles (2) coming from the feed belt (4), so that they will be positioned and spaced as desired upon the engaging of a driving system (19) upstream from an article (2).

7. A device according to claim 6, characterised in that the means (20) for ordering and controlling the rate of the articles are shown in the form of a star-shaped wheel, mounted pivoting around a rotation axis (R') and driven by motorised means (21), including on its periphery a cogged arrangement (21) suitable for engaging and disengaging the articles (2), with the cogged arrangement having recesses (22) suitable for receiving the articles (2) individually, with the tangential speed of the said star-shaped wheel being equal to its input speed (VE).

8. A device according to claim 3, characterised in that the control device controls all the motorised means according to predetermined speed profiles so as to be able to determine the number of articles per batch and/or the gap between each batch.

9. A device according to claim 3, characterised in that the motorised means are shown in the form of motors for which the rotation speeds are adjustable continuously.

10. A device according to claim 9, characterised in that the motors are electrical motors of the brushless, direct current type.

* * * * *